United States Patent Office 3,060,602
Patented Oct. 30, 1962

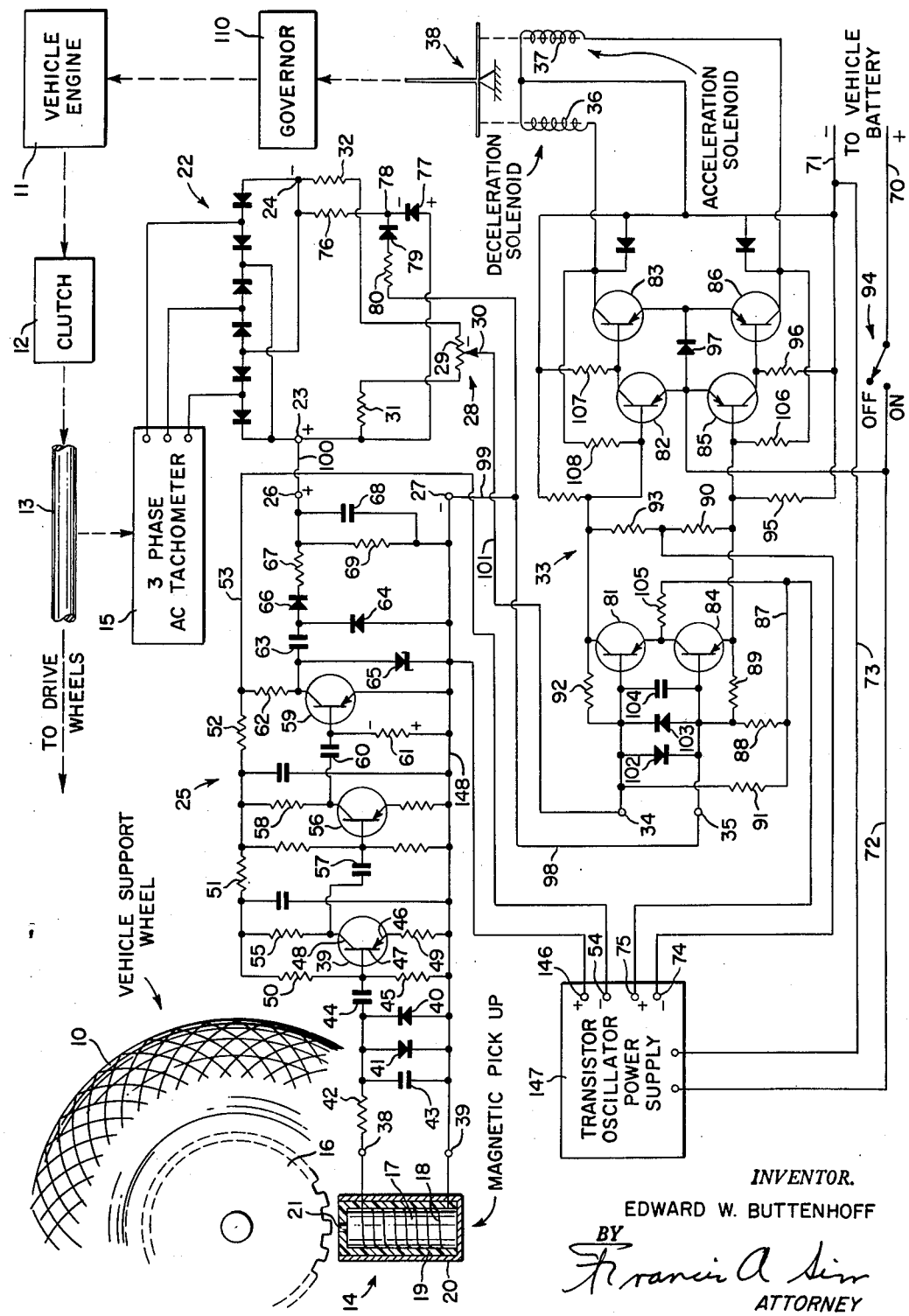

3,060,602
CONTROL APPARATUS
Edward W. Buttenhoff, Excelsior, Minn., assignor to Minneapolis-Honeywell Regulator Company, Minneapolis, Minn., a corporation of Delaware
Filed July 22, 1960, Ser. No. 44,633
5 Claims. (Cl. 37—129)

This invention is concerned with control apparatus adapted to be used with engine driven earth working or moving machinery, and more particularly with apparatus for automatically controlling the engine's speed to provide the optimum in slip, that is the optimum in speed of the drive means in relation to the ground speed of the machine or vehicle.

The purpose of the present control apparatus is to prevent undue speed of the drive wheels of the earth moving vehicle, with the attendant tire wear and excessive mechanical wear and tear on the associated mechanical linkages. For example, it has been found that, without the use of the present invention, tire wear may be as high as five dollars per hour during operation, as the operator normally attempts to add traction. It is well recognized that, for maximum efficiency, it is desirable to operate with a certain given amount of slip. It is desirable that, at least to a certain extent, the drive wheels of the vehicle be turning faster than the ground speed of the vehicle. In other words, the drive wheels are slipping to a certain extent. For optimum efficiency, this slip is controlled by the control apparatus of the present invention.

With the apparatus of the present invention, the means for sensing the speed of the vehicle with relation to the ground and the means for sensing the speed of the drive means may be associated with earth moving vehicles with a minimum amount of modification thereof. Such a construction allows comparatively easy retrofitting of vehicles presently in use, as well as the installation of such control apparatus on vehicles as they are manufactured. One specific application of the present invention is as applied to the self-propelled scraper vehicle type of vehicle in which a scraper bowl assembly is supported at the rear portion thereof by a support wheel and the forward portion of the scraper bowl is supported by driving wheels which are connected to an integrally mounted variable speed engine. The scraper bowl is constructed and arranged so that a portion thereof may be lowered into engaging position with the earth and subsequent movement of the vehicle causes the scraper bowl to be filled, whereupon the scraper bowl can be raised to non-engaging position and the earth thus loaded may be moved. During the loading operation of the scraper bowl it is usually necessary to provide auxiliary power means, such as a bulldozer, to push the scraper vehicle to assist in the actual loading of the scraper bowl. It has been found that during such a loading operation the drive wheels of the scraper vehicle can provide some degree of assistance in moving the scraper bowl. For maximum efficiency, taking into account the wear and tear on the scraper vehicle itself, a given amount of slip should occur between the drive wheels and the support wheels. After the scraper bowl is loaded, then this slip normally does not occur since the scraper vehicle, in its loaded condition, has a maximum amount of traction and operates efficiently without means for controlling the slip.

As a further novel concept, the present invention provides manual control means which may be selectively operable by the operator of the scraper vehicle to render the apparatus of the present invention operative during that time in which the mechanical assist is being provided to load the scraper bowl.

A further characteristic of such earth moving equipment is that under certain extreme conditions the vehicle may actually stall and the drive wheels then spin in position without the vehicle moving. Under such an extreme condition the apparatus of the present invention provides a "minimum r.p.m. control" for the engine to insure that the engine speed is not reduced, in an attempt to reduce the slip, to a point where "lugging" of the engine takes place. Such operation of the engine is extremely harmful to the engine in that it causes mechanical failure, such as burning of the valves of the engine. Accordingly, the present invention provides a unique means to insure that the engine speed may not be reduced below a minimum safe value. At engine speeds above this safe value, the speed of the engine may be controlled to provide the desired slip. Furthermore, manually operable means, again controllable by the operator of the vehicle, may be provided to select and vary the desired slip for the particular conditions under which the earth moving vehicle is then operated.

The preferred embodiment of the present invention is shown in schematic form in the single FIGURE.

Referring to this single FIGURE, reference numeral 10 designates the support wheel of an earth working vehicle, such as may be mounted at the rear portion of a scraper vehicle and supports the scraper bowl. An example of such a vehicle is the Caterpillar Model DW–21 trailer and Model 470 scraper. Reference numeral 11 designates the vehicle engine which is connected through a clutch 12 to supply motive force to a drive shaft 13 adapted to be connected to the drive wheels of the scraper, these components being shown in block form. Governor 110, also in block diagram form, controls the speed of engine 11, under the control of a manual throttle, not shown.

Reference numeral 14 designates generally a first speed responsive means, responsive to the speed of the vehicle support wheel 10. Reference numeral 15 designates generally a second speed responsive means, responsive to the speed of the drive means, for example the drive wheels, of the vehicle.

Referring specifically to the first speed responsive means 14, this means is a magnetic pick-up type device which includes a code wheel 16 having a series of equally spaced teeth, the wheel 16 being formed of a magnetic material and being physically mounted on the vehicle support wheel 10 and adapted to rotate therewith, the speed of rotation being determined by the speed of the vehicle support wheel. The pick-up member includes a permanent magnet 17, a coil 18 wound about the permanent magnet, a housing consisting of insulating material 19 and a magnetic metal housing 20. Magnet 17 is provided with a pointed end 21 which faces the teeth of code wheel 16. As the teeth of the code wheel pass the end 21 of the permanent magnet, the flux path between member 21 and member 20 is changed and a current is induced in coil 18. Thus a pulse is obtained each time a tooth passes the magnet. The faster the vehicle support wheel 10 turns, the higher is the frequency of the pulses which are induced in coil 18. Thus, the frequency of these pulses is an indication of the speed of the vehicle support wheel and thereby an indication of the ground speed of the earth moving vehicle.

The second speed responsive means 15 consists of a three phase A.C. tachometer which has its output connected to a three phase rectifier 22 to produce a D.C. output voltage at the terminals 23 and 24, terminal 23 being positive with respect to terminal 24. Tachometer 15 is constructed and arranged to provide an increasing magnitude output voltage as the speed of the driving means increases. Therefore, the apparatus does not function to control engine speed when the drive shaft 13 is not turning i.e. the clutch is disengaged.

The output of first speed responsive means 14 is connected to a pulse shaping amplifier designated generally by means of reference numeral 25. The output of amplifier 25 consists of terminals 26 and 27, this output being a D.C. voltage so that terminal 26 is positive with respect to terminal 27. The voltage present across terminals 26 and 27 is compared, by means of a voltage comparing circuit, to a presented portion of the voltage present across terminals 23 and 24. This preselected portion of the voltage is selected by means of a percentage slip potentiometer identified by means of reference numeral 28. This potentiometer includes a resistance element 29 and a movable wiper 30. Resistance element 29 is connected through resistors 31 and 32 to terminals 23 and 24 and in this manner a preselected voltage may be provided at tap 30 which is negative with respect to the voltage at terminal 23. The voltage comparing circuit algebraically adds the voltage from terminals 26 and 27 and terminals 23 and 30, adding these voltages in opposition and applying a resultant voltage to the input of an impedance matching solenoid amplifier identified generally by means of reference numeral 33. The input of solenoid amplifier 33 exists at terminals 34 and 35 while the output of amplifier 33 consists of a deceleration solenoid 36 and an acceleration solenoid 37, the solenoids being connected to a linkage 38 which is connected to the governor to control the speed of the vehicle engine.

Operating voltage for the apparatus is derived from the power line conductors 70 and 71 which are adapted to be connected to the vehicle battery. Conductors 70 and 71 are connected to a transistor oscillator power supply 147 by means of conductors 72 and 73 respectively. The output of transistor oscillator power supply consists of terminals 74 and 75 as one output and terminals 146 and 54 as a second output, the polarity of the output voltage being as indicated.

Referring now specifically to amplifier 25, the input of this amplifier, that is terminals 38 and 39, is connected to coil 18 of the magnetic pick-up. The A.C. voltage induced in coil 18 is applied to the base-to-emitter circuit of a transistor 39 through a clipping circuit which clips both the positive and negative peaks of the A.C. voltage. This clipping circuit consists of diodes 40 and 41 in combination with resistor 42 and capacitor 43. The resultant voltage is applied to the input of transistor 39 through a coupling capacitor 44 and an A.C. signal voltage is thus developed across resistor 45.

Referring specifically to the circuit of transistor 39, this transistor includes an emitter electrode 46, a base electrode 47, and a collector electrode 48. Transistor 39 is normally biased to a conducting condition by means of a circuit which can be traced from the positive terminal 46 of a transistor oscillator power supply 47, through conductor 48, resistor 49, the emitter-to-base circuit of transistor 39, resistors 50, 51 and 52, and conductor 53 to the negative supply terminal 54.

The A.C. voltage which is developed across resistor 45, as above mentioned, is amplified by the circuit means including transistor 39 and an amplified A.C. voltage is developed across load resistor 55. This A.C. signal is applied to the input of a further transistor 56 through a coupling capacitor 57.

The circuit means including transistor 56 is similar to that of transistor 39, and this circuit means functions to again amplify the A.C. signal and develop an output A.C. voltage across load resistor 58. This A.C. voltage is applied to the input of a third transistor 59 through a coupling capacitor 60, the A.C. voltage being developed as an A.C. signal across resistor 61.

Transistor 59 is biased to be normally nonconductive and the A.C. signal developed across resistor 61 is effective to render this transistor conductive only during that half cycle of the A.C. signal in which the upper terminal of resistor 61 is negative with respect to the lower terminal. During this half cycle, an emitter to collector current flows through transistor 59 and develops an output voltage across load resistor 62, this output voltage being of a polarity such that the lower terminal of this resistor is positive with respect to the upper terminal. In this manner, a cyclic step voltage is developed across resistor 62.

This cyclic step voltage is applied to a differentiating circuit including capacitor 63 and diode 64. A further diode 66 is provided to block the negative portions of the resultant differentiated voltage and the positive portions thereof are applied to an integrating circuit including resistor 67, capacitor 68, and resistor 69. As a result, a positive voltage is developed at output terminal 26 with respect to output terminal 27, the magnitude of this positive voltage being an indication of the frequency of the signal which is received from the magnetic pick-up, and thus an indication of the speed of the vehicle support wheel.

Referring now specifically to the arrangement by which a D.C. signal voltage is developed whose magnitude is indicative of the speed of the vehicle drive means, as has been mentioned, tachometer 15 in combination with three phase rectifying means 22 provides a variable D.C. voltage at terminals 23 and 24, terminal 23 being positive. This voltage is applied to a voltage divider including resistors 32 and 31 and the resistance element 29 of potentiometer 28. Potentiometer wiper 30 is manually controllable by the vehicle operator to vary the voltage present on wiper 30, to thus control and preset a desired percentage of slip. The desired percentage of slip may vary in accordance with the particular characteristics of the earth moving equipment and the conditions under which it may be operated.

A second voltage divider in the form of a resistor 76 connected in series with a diode 77 is connected across terminals 23 and 24. Diode 77 may be a silicon diode and serves to regulate the voltage at the intermediate terminal 78. The voltage at terminal 78, which is negative with respect to terminal 23, is applied to a network including a series connected diode 79 and resistor 80 and then to input terminal 35 of amplifier 33. As will be apparent, the voltage present on terminal 78, as applied through network 79—80, is effective to determine the minimum engine speed below which the engine is not allowed to run. Under extremely difficult operating conditions, the earth moving vehicle may actually stall or approach a stall condition wherein the vehicle does not move relative to the earth. Under such a condition, the engine is not allowed to reduce in speed to produce the desired percent slip, but rather the circuit including members 79 and 80 is effective to control the minimum speed in which the engine may run, thus producing a greater amount of slip than selected by wiper 30. While this somewhat greater amount of slip may increase the tire wear and the wear and tear on the mechanical drive of the vehicle, it is necessary to tolerate such a condition to protect the engine itself from excessive damage which may be attendant to extremely low operating speeds.

Referring now specifically to the solenoid amplifier, this amplifier consists essentially of a first channel including transistors 81, 82 and 83 which controls the deceleration solenoid 36, and a second channel including transistors 84, 85 and 86 which control the acceleration solenoid 37. This amplifier is essentially a push-pull amplifier and functions to increase the sensitivity of the apparatus and reduce the loading of the comparing means.

Considering transistors 81 and 84, these transistors are biased to be somewhat conductive. Considering transistor 84, a circuit can be traced from the positive power supply terminal 75 through conductor 87, resistor 88, resistor 89, and resistor 90 to the negative power supply terminal 74. This circuit is effective to bias transistor 84 to be conductive. A further circuit can be traced from power supply terminal 75 through conductor 87, resistor 91, resistor 92, and resistor 93 to the negative power supply terminal 74. This circuit is effective to bias transistor 81 to be conductive.

Considering now transistors 85 and 86, transistor 85 is biased to be conductive by means of a circuit which can be traced from the positive power line conductor 70 through the on-off switch 94, the emitter-to-base circuit of transistor 85, and resistor 95 to the negative power supply conductor 71. With transistor 85 thus rendered conductive, an emitter-to-collector current flows through a resistor 96 and a very low resultant voltage drop exists between the emitter and collector electrodes of this transistor. The base electrode of transistor 86 is directly connected to the emitter electrode of transistor 85 while the emitter electrode of transistor 85 is connected through a diode 97 to the emitter electrode of transistor 86. The small voltage drop existing between the emitter and collector of transistor 85 is insufficient to overcome the forward voltage drop of diode 97 and therefore transistor 86 is maintained nonconductive.

With regard to transistors 82 and 83, it is believed sufficient to state that they are connected in an electrical circuit identical to that of transistors 85 and 86 and in this manner transistor 82 is normally maintained conductive while transistor 83 is normally maintained nonconductive.

Considering now the manner in which input voltage is applied to input terminals 34 and 35 of solenoid amplifier 33, a circuit can be traced from terminal 35 through conductors 98 and 99, terminals 27 and 26, conductor 100, terminal 23, resistor 31, resistance element 29 and potentiometer wiper 30 of potentiometer 28, and conductor 101 to the other input terminal 34. From this circuit it can be seen that the voltage present between terminals 26 and 27 is connected in opposition to the voltage present between terminal 23 and potentiometer wiper 30. The voltage present between terminals 26 and 27 increases with vehicle speed whereas the voltage between terminal 23 and wiper 30 increases with speed of the vehicle driving means. Also, the voltage present between terminal 23 and potentiometer wiper 30 can be selectively controlled by the positioning of potentiometer wiper 30, and in this manner the desired percentage slip is selected.

Also, from this above circuit it can be seen that when terminal 35 is negative with respect to terminal 34 then, in this condition, the voltage present between terminals 26 and 27 is larger than the voltage present from terminal 23 to potentiometer wiper 30. For this condition, the percentage slip which then exists is less than that which has been selected by positioning of potentiometer wiper 30. When terminal 35 is positive with respect to terminal 34, then the opposite condition exists and the voltage between terminal 23 and potentiometer wiper 30 is greater than the voltage between terminals 26 and 27. For this particular condition the slip which then exists is greater than that which has been selected by positioning of potentiometer wiper 30. When the voltage present between input terminals 34 and 35 is zero, or very close to zero, then the voltage present across terminals 36 and 27 is equal to or very closely approximates the voltage present from terminal 23 to potentiometer wiper 30 and for this particular condition, the slip is substantially that which has been selected by positioning of potentiometer wiper 30.

The input voltage applied to input terminals 34 and 35 is also applied to a pair of reverse connected diodes 102 and 103 which are effective as clippers for an over voltage condition. This input voltage is likewise applied to a capacitor 104 and also across the base electrodes of transistors 81 and 84 respectively.

Consider first the condition in which the vehicle support wheel 10 is turning at a speed which, when compared to the speed of the driving means, results in a slip which is less than that which has been preselected by positioning of potentiometer wiper 30. In this case, terminal 35 is negative with respect to terminal 34. The negative voltage which is applied to the base electrode of transistor 84 renders this transistor more heavily conductive and as a result the potential level of its collector electrode becomes more positive. As a result, an increased current flows and its circuit can be traced from terminal 75 through resistor 105, the emitter-to-collector circuit of transistor 84, and resistor 90 to power supply terminal 74. As a result, a positive pulse of voltage is applied to the base electrode of transistor 85 and this positive pulse is effective to render transistor 85 nonconductive, or at least less conductive than in its normal state. With transistor 85 less conductive, the potential level of the collector electrode of this transistor moves in a negative direction, due to a reduced voltage drop across resistor 96, and a negative pulse of voltage is applied to the base electrode of transistor 86, thus rendering transistor 86 conductive. With transistor 86 conductive, a feedback voltage is applied to the base electrode of transistor 85 through resistor 106 and this feedback voltage is such as to render transistor 85 less conductive and thereby render transistor 86 more conductive. Thus, the circuit including resistor 106 functions as a snap acting arrangement.

With transistor 86 now conductive, a current flow circuit can be traced from positive power supply conductor 70 through switch 94, diode 97, the emitter-to-collector circuit of transistor 86, and acceleration solenoid 37 to the negative power supply conductor 71. In this manner, linkage 38 controls governor 110 to increase the engine speed and thereby increase the output of tachometer 15. This in turn increases the voltage between terminal 23 and potentiometer wiper 30 and the voltage at amplifier input terminals 34 and 35 now indicates that the desired slip is now being produced.

As the voltage at amplifier input terminals 34 and 35 is reduced to substantially zero, the acceleration solenoid is deenergized and linkage 38 returns to its normal position. However, governor 110 is constructed and arranged to remain in its new position until subsequently adjusted, either manually by the throttle, or automatically by means of solenoids 36 or 37.

Consider now the condition in which input terminal 35 is positive with respect to terminal 34. As has been explained, this is the condition in which the voltage present between terminal 23 and wiper 30 predominates, and such a condition indicates that the drive means of the vehicle is running at a higher speed than is desired to thus produce a greater slip than that preselected by positioning of potentiometer wiper 30. When such a condition exists, a negative voltage on terminal 34 is applied to the base electrode of transistor 81 and this transistor is rendered more conductive. This current flow circuit can be traced from positive terminal 75 of power supply 47 through resistor 105, the emitter-to-collector circuit of transistor 81, and resistor 93 to the negative terminal 74 of power supply 47. As a result of this increase in current flow, and the increased voltage drop across resistor 93, the potential level of the emitter electrode of transistor 81 moves in a positive direction and this positive pulse of voltage is applied to the base electrode of transistor 82. This positive pulse of voltage is effective to render transistor 82 nonconductive, or at least less conductive and as a result a lower magnitude current flows through a circuit which can be traced from the positive power supply conductor 70 through switch 94, the emitter-to-collector circuit of transistor 82, and resistor 107 to the negative power supply conductor 71. As a result of this reduced current flow through resistor 107, the collector electrode of transistor 81 moves in a negative direction and this negative pulse of voltage is applied to the base electrode of transistor 83 to render this transistor conductive. Here again, resistor 108 is provided to function similar to resistor 106, as above described, to provide snap action. The current flow circuit for transistor 83 can be traced from the positive power line conductor 70 through diode 97, the emitter-to-collector circuit of transistor 83, and the deceleration solenoid 36 to negative power supply conductor 71. Energization of the deceleration solenoid, through the medium of linkage 38 and governor 110, is effective to reduce the engine speed and thereby reduce the slip to the desired value, at which condition the voltage present between terminal 23 and potentiometer wiper 30 is lowered, thus reducing the input voltage to terminals 34 and 35 with a resultant de-energization of the deceleration solenoid. Here again, governor 110 remains at its adjusted position.

As has been pointed out, in certain instances it is desirable to utilize the control apparatus to automatically control the amount of slip only during certain phases of operation of the earth moving vehicle. Thus, an on-off switch 94 is provided and the vehicle operator may selectively open and close this switch as desired to automatically control the slip in accordance with a desired value as selected by potentiometer wiper 30, the automatic operation occurring during the periods in which this switch is closed.

From the above description it can be seen that I have provided an improved control apparatus which is particularly adapted for use with earth moving machinery to provide the optimum in efficient operation of the vehicle, controlling the slip of the drive means of the vehicle automatically to a value which has been preselected. Furthermore, means are provided such that the control apparatus may be rendered operative or inoperative, at the discretion of the operator. Also, automatic safety means have been provided such that the control apparatus does not cause the vehicle engine to run at an excessively low speed in an attempt to produce the selected degree of slip. Thus, the vehicle engine is protected from damage which usually occurs when run at an excessively low speed. This safety feature is accomplished automatically without requiring that the operator of the vehicle pay close attention to the speed in which the engine is running at any particular time during a period in which the apparatus of the present invention is being utilized to produce a desired value of slip.

Other modifications of the present invention will be apparent to those skilled in the art and it is therefore intended that the scope of the present invention be limited solely to that defined by the appended claims.

I claim as my invention:

1. In combination with an earth working vehicle having drive means, a support wheel, and a variable speed engine to supply power to the drive means, speed responsive means associated with the support wheel to provide a first signal of a first polarity and of a magnitude indicative of the speed of the support wheel, speed responsive means associated with the drive means to provide a second opposite polarity signal of a magnitude indicative of the speed of the drive means, comparing means connected to said speed responsive means and having output means to control engine speed to give an optimum slip, and a further signal source of said opposite polarity and of a fixed magnitude connected to said comparing means to provide a minimum engine speed.

2. In combination with an earth moving vehicle having drive means, a support wheel, a variable speed engine to supply power to the drive means, and means providing a first signal of a first characteristic and of a magnitude indicative of the speed of the support wheel, apparatus comprising; speed responsive means associated with the drive means to provide a signal having a characteristic opposite the first characteristic and having a magnitude indicative of the speed of the drive means, comparing means connected to said speed responsive means and adapted to be connected to the means associated with the support wheel to compare said signal of said opposite characteristic with the signal of the first characteristic to provide an output indicative of slip, means controlled by said output adapted to be connected in controlling relation to the variable speed engine to control the engine speed to provide an optimum slip, a further signal source of the first characteristic having a fixed magnitude, and means connecting said further signal source to said comparing means to provide a minimum magnitude signal of the first characteristic in the event that the earth working vehicle tends to stall, to thereby control the minimum speed of the engine to prevent engine damage attendant to very low engine speeds.

3. In combination, an earth moving vehicle of the type having a support wheel and a drive wheel with a variable speed engine connected to supply driving power to the drive wheel, the vehicle including an earth working member adapted to be lowered into earth engaging position whereupon subsequent movement of the vehicle loads the vehicle, the vehicle being constructed and arranged to receive a mechanical assist in moving during the process of loading, first speed responsive means connected to the support wheel to provide a first D.C. signal of a first polarity and of a magnitude indicative of the speed of the support wheel, second speed responsive means associated with the drive wheel to provide a second D.C. signal of an opposite polarity and of a magnitude indicative of the speed of the drive wheel, the relative magnitudes of said first and second signals being indicative of the slip which occurs, an adjustable potentiometer connected to said second speed responsive means and adjustable to provide a voltage at the wiper thereof which is somewhat less than the magnitude of said second signal to thereby select a desired degree of slip, signal comparing means adding said first signal and the signal present at the wiper of said potentiometer in series opposition such that a resultant signal is obtained, said resultant signal being of said first polarity when the slip is below the desired degree, being of said opposite polarity when the slip is above said desired degree, and being substantially zero when the slip is equal to said desired degree, polarity responsive amplifier means selectively responsive to signals of said first and said opposite polarity to provide a first or a second output in response thereto, circuit means connecting said signal comparing means to the input of said amplifier means, further means controlled by the output of said amplifier means to increase or to reduce the engine speed when said resultant signal is of said first or said opposite polarity respectively, and manually operable control means adapted to be selectively controlled by the operator of the vehicle to render said amplifier operative to control the engine speed during the loading of said vehicle during which time a mechanical assist is provided.

4. In combination, an earth moving vehicle of the type having a support wheel and a drive wheel with a variable speed engine connected to supply driving power to the drive wheel, the vehicle including an earth working member adapted to be lowered into earth engaging position whereupon subsequent movement of the vehicle loads the vehicle, the vehicle being constructed and arranged to receive a mechanical assist in moving during the process of loading, first speed responsive means connected to the support wheel to provide a first D.C. signal of a first polarity and of a magnitude indicative of the speed of the support wheel, second speed responsive means associated with the drive wheel to provide a second D.C. signal of an opposite polarity and of a magnitude indicative of the speed of the drive wheel, the relative magnitudes of said first and second signals being indicative of the slip which occurs, an adjustable potentiometer connected to said second speed responsive means and adjustable to provide a voltage at the wiper thereof which is somewhat less than the magnitude of said second signal to thereby select a desired degree of slip, signal comparing means adding said first signal and the signal present at the wiper of said potentiometer in series opposition such that a resultant signal is obtained, said resultant signal being of said first polarity when the slip is below the desired degree, being of said opposite polarity when the slip is above said desired degree, and being substantially zero when the slip is equal to said desired degree, polarity responsive amplifier means selectively responsive to signals of said first and said opposite polarity to provide a first or a second output in response thereto, circuit means connecting said signal comparing means to the input of said amplifier means, further means controlled by the output of said amplifier means to increase or to reduce the engine speed when said resultant signal is of said first or said opposite polarity respectively, manually operable control means adapted to be selectively controlled by the operator of the vehicle to render said amplifier operative to control the engine speed during the loading of said vehicle during which time a mechanical assist is provided, further circuit means connected to receive an input signal from said second speed responsive means and to provide an output signal of said first phase and of a constant magnitude, and means connecting said last named output to the input of said amplifier means to establish a minimum engine speed in the event of stalling or heavy loading of said vehicle.

5. In combination, an earth moving vehicle of the type having support wheel means and drive means with a variable speed engine connected to supply driving power to the drive wheel means, the vehicle including an earth working member adapted to be lowered into earth engaging position and to then work the earth as the vehicle moves, the vehicle being constructed and arranged to receive a mechanical assist in so moving, first speed responsive means associated with the support wheel means to provide a first output signal of a speed-variable characteristic which is indicative of the speed of the support wheel means, second speed responsive means associated with the drive wheel means to provide a second output signal of the speed-variable characteristic which is indicative of the speed of the drive wheel means, the first and second output signals when related to each other being indicative of the slip which occurs, signal comparing means having output means and having input means, means connecting said input means to said first and second speed responsive means to provide an output of a first characteristic at said output means when the slip is above a desired value and an output of a second characteristic at said output means when the slip is below a desired value, means connecting said output means in controlling relation to said engine to decrease or to increase the engine speed when the output at said output means is of said first or said second characteristic respectively, and manually operable control means adapted to be selectively controlled by the operator of the vehicle to render said last named means operative to control the engine speed during the periods during which a mechanical assist is provided.

References Cited in the file of this patent

UNITED STATES PATENTS

| | | |
|---|---|---|
| 1,848,873 | Eames | Mar. 8, 1932 |
| 2,321,059 | Anderson | June 8, 1943 |
| 2,337,717 | Hines | Dec. 28, 1943 |
| 2,347,882 | Choate et al. | May 2, 1944 |
| 2,389,368 | King | Nov. 20, 1945 |
| 2,654,301 | Bohmker | Oct. 6, 1953 |
| 2,806,149 | Lillquist | Sept. 10, 1957 |
| 2,927,649 | Poyner et al. | Mar. 8, 1960 |
| 2,931,112 | Wilkinson | Apr. 5, 1960 |
| 2,986,827 | Peterson | June 6, 1961 |
| 3,025,722 | Eger et al. | Mar. 20, 1962 |

FOREIGN PATENTS

| | | |
|---|---|---|
| 7,589 | Great Britain | Apr. 6, 1908 |